(12) United States Patent
Ishida (10) Patent No.: US 6,619,868 B2
(45) Date of Patent: Sep. 16, 2003

(54) PRINTING SERVICE SYSTEM (75) Inventor: Hironobu Ishida, Kaisei-machi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/108,870

(22) Filed: Mar. 29, 2002

(65) Prior Publication Data

US 2002/0159807 A1 Oct. 31, 2002

(30) Foreign Application Priority Data

Mar. 29, 2001 (JP) ........................................ 2001/094616

(51) Int. Cl.[7] ................................................. B41J 11/44
(52) U.S. Cl. ............................. 400/76; 400/61; 400/70; 396/429
(58) Field of Search .......................... 400/76, 70, 61; 705/40; 355/39; 396/429

(56) References Cited

U.S. PATENT DOCUMENTS 5,974,401 A * 10/1999 Enomoto et al. ............. 705/40
6,324,521 B1 * 11/2001 Shiota et al. ................. 705/27
6,417,913 B2 * 7/2002 Tanaka ......................... 355/39
2001/0021311 A1 * 9/2001 Mizumo
2001/0022913 A1 * 9/2001 Ohmura
2001/0041985 A1 * 11/2001 Shiota et al.
2001/0042086 A1 * 11/2001 Ueda et al.
2001/0050684 A1 * 12/2001 Smith
2002/0015176 A1 * 2/2002 Takao et al.
2002/0015179 A1 * 2/2002 Igarashi et al.

* cited by examiner

*Primary Examiner*—Charles H. Nolan, Jr.
(74) *Attorney, Agent, or Firm*—Birch, Stewart, Kolasch & Birch, LLP (57) ABSTRACT At the time of placing an order for printing image data via a network, the order can be efficiently rerouted in the case where a printing service provider designated according to an agency specified by a user cannot process the order. A database in a service center stores a laboratory information table. The printing service provider registers with the laboratory information table in advance the printing services available thereat and rerouting information to automatically send order information representing processing that cannot be processed by the printing service provider, such as large-size printing and postcard printing, to another printing service provider. An order reception server judges the content of order information sent from the user and sends the order information to the printing service provider designated by the rerouting information in the laboratory information table if necessary.

7 Claims, 10 Drawing Sheets

| | | STORE CODE | 111234 |
|---|---|---|---|
| NAME | MINAMIASHIGARA PRINT SHOP | | |
| COMPANY MAME | MINAMIASHIGARA PRINTING SERVICE CO. | | |

- REROUTING SETTING
  - ☐ AUTOMATIC REROUTING OF LARGE-SIZE PRINT ORDER
  - ☐ AUTOMATIC REROUTING OF POSTCARD ORDER
  - ☐ REROUTING ADDRESS

| Field | Value |
|---|---|
| ZIP CODE | 258 – 8538 |
| PREFECTURE | KANAGAWA-KEN |
| CITY | MINAMIASHIGARA-SHI |
| TOWN OR VILLAGE | |
| STREET | |
| PHONE NUMBER | 0465-85-2020 |
| PERSON IN CHRAGE | |
| FAX NUMBER | |
| BUSINESS HOURS | |
| SUPPLEMENTARY INFORMATION | |

AVAILABLE SERVICES AND TIME NECESSARY FOR PROCESSING

| NAME OF SERVICES | TIME NECESSARY (DAYS) |
|---|---|
| NETWORK DIGITAL CAMERA PRINTING | 1 |
| NETWORK PERSONAL COMPUTER PRINTING | 1 |

[UPDATE] [PRINT] [CANCEL]

| AGENCY MAME | [    ] | STORE CODE | [    ] |

ZIP CODE [  ] – [  ]
PREFECTURE [    ]
CITY [    ]
TOWN OR VILLAGE [    ]
STREET [    ]
PHONE NUMBER [    ]
FAX NUMBER [    ]
PERSON IN CHRAGE [    ]
BUSINESS HOURS [    ]
SUPPLEMENTARY INFORMATION [    ]

SERVICES AVAILABLE
☐ NETWORK DIGITAL CAMERA PRINTING
☐ NETWORK PERSONAL COMPUTER PRINTING
☐ NETWORK POSTCARD PRINTING
☐ NETWORK PHOTOGRAPH ALBUM PRINTING

[REGISTER]  [CANCEL]

FIG. 10

NUMBER OF SERVICES [4]

○ SERVICES AVAILABLE      × SERVICES UNAVAILABLE

TIME NECESSARY FOR PROCESSING (DAYS)

| NAME OF SERVICES | |
|---|---|
| NETWORK DIGITAL CAMERA PRINTING | 1 |
| NETWORK PERSONAL COMPUTER PRINTING | 1 |
| NETWORK POSTCARD PRINTING | 5 |

NETWORK PHOTOGRAPH ALBUM PRINTING

[>]
[<]

TIME NECESSARY FOR SELECTED SERVICES [  ] DAYS

[SET]  [CANCEL]

| AGENCY NAME | AVAILABLE PRINTING SERVICES | MINI-LABORATORY |
|---|---|---|
| STORE 6A | ORDINARY/POSTCARD/T-SHIRT | × |
| STORE 6B | ORDINARY/POSTCARD/T-SHIRT | × |
| DPE-STORE LABORATORY 3B | ORDINARY | ○ |
| STORE A | POSTCARD | × |
| STORE B | ORDINARY | ○ |

FIG.14

| | AGENCY NAME | ADDRESS | PHONE NUMBER |
|---|---|---|---|
| QUICK | STORE A | KAWASAKI-SHI, KANAGAWA-KEN | 044-123-4567 |
| | STORE B | KAWASAKI-SHI, KANAGAWA-KEN | 044-765-4321 |
| QUICK | STORE C | KAWASAKI-SHI, KANAGAWA-KEN | 044-888-8888 |
| | STORE D | KAWASAKI-SHI, KANAGAWA-KEN | 044-475-2623 |

PRINTING SERVICE SYSTEM

BACKGROUND OF THE INVENTION

1. Field of the Invention

The present invention relates to a printing service system for providing services related to photographs for users via a network such as the Internet.

2. Description of the Related Art

There have been known digital photograph service systems for carrying out various kinds of digital photograph services such as storing photographs obtained by users in image servers after digitization thereof, recording the photographs in CD-Rs to be provided to the users, printing images photographed by users with digital cameras, and receiving orders for additional prints. As one form of such digital photograph service systems, a printing service system for receiving print orders via a network such as the Internet has also been proposed.

In such a printing service system, a user installs viewer software to his/her personal computer, which acts as a user terminal, for reproducing image data recorded in a CD-R or obtained by a digital camera. The user reproduces images represented by the image data, and generates order information describing the content of an order by using an ordering function built-in to the viewer software if the user wishes to place an order. The user transfers the order information and the image data to be printed to an order reception server installed in a service center for receiving the order from the user terminal via the network such as the Internet. The order reception server transfers the order information and the image data to a print server installed in a large-scale laboratory for processing the order. Printed matter such as an additional print, a picture postcard, or a photograph album is generated therein based on the order information.

The printed matter generated in the above manner is delivered or mailed to an agency specified by the user at the time of placing the order. In this manner, the user can receive the printed matter by paying a charge at the agency. The user can designate the agency at the time of placing the order, and a desired store or the like close to a place of residence or employment of the user is generally designated as the agency. The image data and the order information are transferred from the order reception server to the laboratory in collaboration with the agency designated by the user.

The user can designate the agency by: (1) selecting the desired agency from a list of agencies displayed on the user terminal; (2) selecting area information such as a prefecture by using the user terminal and then selecting the desired agency from a list of agencies in the selected area; (3) displaying the agency closest to the user on the user terminal, based on a zip code of the user; or (4) directly inputting the name of the agency from the user terminal, for example. In this manner, the user can freely select the agency as desired.

The order information herein referred to is information such as a processing number for specifying the content of a printing service (generation of ordinary prints or picture postcards or the like), an image number for specifying a photograph (a number representing an image data file), a print size, a quantity of prints, specification of printing paper (such as glossy or non-glossy), thickness of the printing paper, the content of photographic processing, and trimming specification, for example. The order information may further include information regarding the name, the address, the zip code and the phone number of the user, for example.

The printed matter generated in the printing service is delivered or mailed to the agency designated by the user at the time of placing the order, and the user receives the printed matter at the agency, as has been described above. If the agency installs a server for receiving the print order and the image data and a printer to print the image data, the agency can function as a laboratory. When the agency has the function of a laboratory, delivery of the printed matter to the agency becomes unnecessary. Therefore, although the agency is small as a laboratory, the time necessary for providing the user with the printed matter can be shortened.

Meanwhile, a printing service system can provide printing services for generating not only ordinary prints or picture postcards but also photograph albums, calendars, and T-shirts or mug cups with image data printed thereon. However, the printing services are carried out by not only a large-scale laboratory but also a small-scale laboratory in a DPE store (hereinafter referred to as a mini-laboratory). Therefore, all the printing services are not necessarily provided at all printing service providers (including large-scale laboratories and mini-laboratories). Especially, in a mini-laboratory, only the printing service for ordinary prints is generally provided, due to limitations of the equipment therein.

Furthermore, some mini-laboratories cannot carry out printing in a large size such as A4 or A5 out due to the limitations of the equipment therein, although the printing service for generating ordinary prints is available thereat. However, a user does not know whether a mini-laboratory can carry out large-size printing at the time the user designates an agency. For this reason, in the case where a print order for a printing service including large-size printing is placed, the order information is transferred to a mini-laboratory designated as the agency even if the mini-laboratory cannot process the large-size printing. In this case, the mini-laboratory cannot process the large-size printing. Therefore, an operator at the mini-laboratory needs to forward the order information to a large-scale laboratory that can carry out the large-size printing.

Meanwhile, the viewer software can be set to automatically designate a specific agency at the time of placing an order. If the viewer software is set in this manner, the agency can increase the profit since the user is highly likely to use the agency.

However, in the case where the specific agency is a mini-laboratory, if the user places an order for a picture postcard by using the viewer software, the order information therefor is transferred to the mini-laboratory via the order reception server. It is highly likely that the mini-laboratory does not have equipment necessary for picture postcard generation. In this case, an operator at the mini-laboratory needs to transfer the order information to a large-scale laboratory that can process picture postcard printing, since the mini-laboratory cannot carry out the picture postcard printing due to lack of equipment.

Therefore, if the order information is sent first to the mini-laboratory and then forwarded to the large-scale laboratory as has been described above, of the burden on the operator at the printing service provider becomes heavier. Furthermore, the time necessary for generating the requested printed matter becomes longer.

SUMMARY OF THE INVENTION

The present invention has been conceived based on consideration of the above circumstances. An object of the present invention is therefore to send order information efficiently.

A printing service system of the present invention comprises:

an order reception server installed in a service center for receiving order information representing an order of a user for a printing service regarding image data, from an order terminal via a network; and printing service provider servers each communicable with the order reception server via the network and each installed in a printing service provider in collaboration with at least one agency capable of receiving printed matter generated in the printing service or installed in a printing service provider acting as an agency itself capable of receiving the printed matter generated in the printing service. In the printing service system, the printing service system receives designation of any one of the agencies capable of receiving the printed matter by using the order terminal at the time the order for the printing service is placed, and the order reception server transfers the order information to the printing service provider that is designated according to the designated agency. In the case where the order information includes an order that cannot be processed by the designated printing service provider, the order reception server carries out rerouting of the order information to one of the printing service providers capable of processing the order.

Each of the printing service providers may be a mini-laboratory functioning as the agency itself or a large-scale laboratory in collaboration with the agency or agencies at which the user can receive the printed matter through delivery or mailing of the printed matter thereto.

The order reception server is a server computer installed in the service center and always connected to the network so that the order reception server can receive the order information and the image data transferred from the order terminal. The order reception server has a function of receiving the printing service order from the user, a function of a database for storing the image data, and a function of communicating with the printing service providers.

The order terminal can be a network-connectable personal computer owned by the user who places the printing service order, or a network terminal installed in a DPE store for placing the printing service order.

As the image data to be printed, any image data can be used, such as image data obtained by the user with a digital camera, or image data generated by digitization of photographs obtained by the user and provided to the user by being recorded in a CD-R. The image data are transferred from the order terminal to the order reception server together with the order information.

The printing service refers to any services related to printing, such as ordinary printing in which the image data obtained by the user with the digital camera or recorded in the CD-R are printed by a photographic printer, printing for generating a picture postcard or a calendar, and printing on a T-shirt, a mug cup, a jigsaw puzzle, or a watch-face. The available printing services vary, depending on the printing service providers.

The agency or agencies capable of receiving the printed matter generated in the printing service desired by the user may include an agency in collaboration with the printing service provider that can provide the printing service desired by the user, or a printing service provider that can provide the printing service desired by the user and acts as the agency itself.

The printing service provider that is designated according to the designated agency is a printing service provider in collaboration with the designated agency or a printing service provider itself when the printing service provider acts as the agency.

It is preferable for the printing service provider capable of processing the order that cannot be processed by the designated printing service provider to be a printing service provider in collaboration with the designated printing service provider.

In the printing service system of the present invention, it is preferable for the order reception server to comprise a center database storing a service provider information table with which service provider information including information regarding the rerouting is registered for each of the printing service providers so that the order reception server can reroute the order information to the printing service provider capable of processing the order that is not processed by the designated printing service provider, based on the service provider information table.

The service provider information table has information registered by each of the printing service providers regarding the name, the address, the phone number, and the fax number thereof, the name of a person in charge, the printing service or services available thereat, and the information regarding the rerouting, for example. It is preferable for each of the printing service providers to register with the service provider information table by accessing the order reception server from the printing service provider server thereof.

The information regarding the rerouting refers to information such as the content of the order to be transferred, the printing service or services appropriate for rerouting, and the name specifying the printing service provider to which the order information is rerouted in accordance with the content of the order, for example.

In the printing service system of the present invention, the designated printing service provider may be a mini-laboratory and the order that cannot be processed by the designated printing service provider may represent large-size printing and/or postcard printing.

An order reception server of the present invention is the order reception server used in the printing service system of the present invention. The order reception server comprises means for carrying out rerouting of the order information to the printing service provider capable of processing the order that cannot be processed by the designated printing service provider, in the case where the order information includes an order that cannot be processed by the designated printing service provider.

It is preferable for the order reception server of the present invention to comprise the center database storing the service provider information table with which service provider information including the information regarding the rerouting is registered for each of the printing service providers so that the means for carrying out rerouting transfers the order information to the printing service provider capable of processing the order that cannot be processed by the designated service provider, based on the service provider information table.

Regarding the order reception server of the present invention, it is preferable for each of the printing service providers to register with the service provider information table by using the printing service provider server thereof that is accessed by the order reception server.

Regarding the order reception server of the present invention, the designated printing service provider may be a mini-laboratory and the order that cannot be processed by the designated printing service provider may represent large-size printing and/or postcard printing.

An order reception method of the present invention is a method used by the order reception server in the printing service system of the present invention, and the order reception method comprises the step of:

rerouting the order information to the printing service provider capable of processing the order that cannot be processed by the designated printing service provider, in the case where the order information includes an order that cannot be processed by the designated printing service provider.

In the order reception method of the present invention, if the order reception server comprises the center database storing the service provider information table with which the service provider information including the information regarding the rerouting is registered for each of the printing service providers, it is preferable for the order information to be sent to the printing service provider capable of processing the order that cannot be processed by the designated printing service provider, based on the service provider information table.

In the order reception method of the present invention, it is preferable for each of the printing service providers to register with the service provider information table by using the printing service provider server thereof that accesses the order reception server.

In the order reception method of the present invention, the designated printing service provider may be a mini-laboratory and the order that cannot be processed by the designated printing service provider may represent large-size printing and/or postcard printing.

The order reception method of the present invention may be provided as a program recorded in a computer-readable recording medium that causes a computer to execute the order reception method.

According to the present invention, in the case where the order information includes an order that cannot be processed by the designated printing service provider, the order information is sent to the printing service provider capable of processing the order. Therefore, the order information is not transferred to the designated printing service provider but transferred directly from the order reception server to the printing service provider specified by the information regarding the rerouting. Therefore, unlike the case in which the order information is transferred to the designated printing service provider first, the order information can be rerouted efficiently without a troublesome operation by an operator at the designated printing service provider. Furthermore, even in the case where the rerouting is necessary, the order information is not transferred via the designated printing service provider. Therefore, the time necessary for providing printed matter can be shortened, compared with the case in which the order information is forwarded via the designated printing service provider.

Moreover, the center database stores the service provider information table with which the service provider information, including the information regarding the rerouting, is registered. By rerouting the order information based on the service provider information table, the order information can be rerouted easily and thus efficiently.

By enabling each of the printing service providers that accesses the order reception server to carry out registration with the service provider information table, the printing service provider in access to the order reception server can set the information regarding the rerouting as desired.

DESCRIPTION OF THE PREFERRED EMBODIMENT

Figure 1:
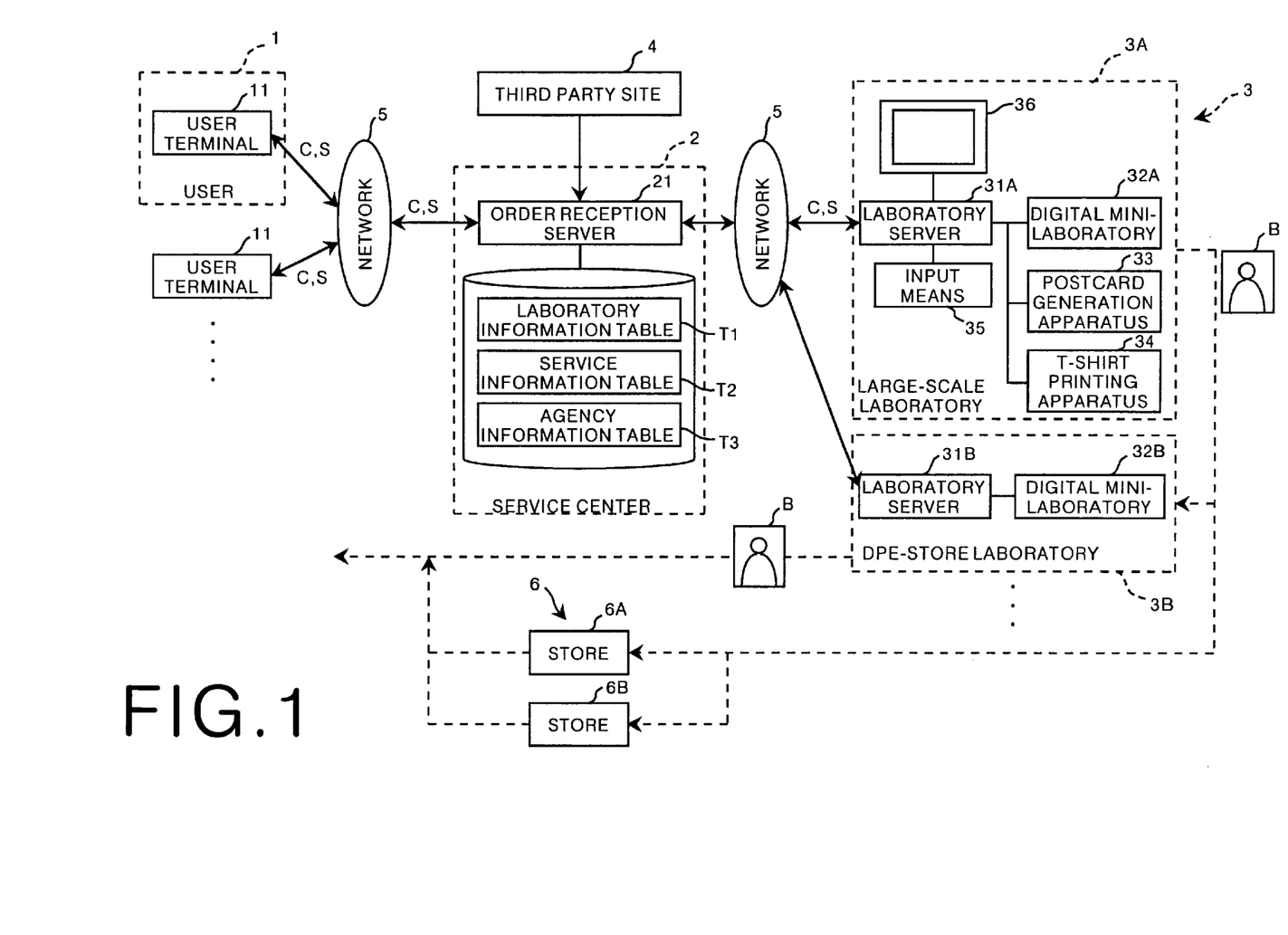
FIG. 1 is a block diagram showing a configuration of a printing service system of an embodiment of the present invention.

Hereinafter, an embodiment of the present invention will be explained with reference to the accompanying drawings. FIG. 1 is a block diagram showing a configuration of a printing service system of the embodiment of the present invention. As shown in FIG. 1, in the printing service system in this embodiment, data, prints, and the like are exchanged between a user 1, a service center 2, printing service providers 3, and agencies 6. In FIG. 1, the flow of data is shown by a solid line while the flow of an object is shown by a broken line.

The user 1 has a personal computer that acts as a user terminal 11, and the personal computer comprises a hard disc, a display screen, a keyboard, a mouse, a CD-ROM drive, and a PC card slot for reading image data from a recording medium for a digital camera (such as SmartMedia or CompactFlash). As will be explained later, the user 1 can place a print order with the service center 2 via a network 5 such as the Internet. In the case where the user 1 does not have a personal computer, the user 1 can place a print order by using a terminal dedicated to placing orders and installed in a printing service station such, as a DPE store.

A CD-R recorded with viewer software having functions of image display, generation of order information C, and transfer of the order information C is provided to the user 1 in advance, and the user 1 sets the CD-R in the CD-ROM drive (not shown) of the user terminal 11. In this manner, the user installs the viewer software recorded in the CD-R in the user terminal 11. The user 1 can browse through and manipulate image data S, generate the order information C representing the content of the print order regarding the image data S, and place the print order, by using the viewer software. At the time of placing the order, the user terminal 11 accesses the service center 2 by using a function of the viewer software, and transfers to the service center 2 the order information C and the image data S from which printed matter B is generated.

The service center 2 has an order reception server 21 for receiving the print order. The order reception server 21 is always connected to the network 5, and receives the order information C and the image data S transferred from the user terminal 11. The order reception server 21 selects one of the printing service providers 3 for carrying out the printing, based on the order information C. The printing service providers 3 include a large-scale laboratory 3A in collaboration with agencies to be designated at the time of placing the order for receiving the printed matter B, and a DPE-store laboratory 3B also functioning as an agency. The order reception server 21 transfers the order information C and the image data S to the printing service provider 3 that has been selected. The order reception server 21 has a database function of storing the image data S and a function of communicating with the printing service providers 3.

The order reception server 21 is connected to a database 22 storing a laboratory information table T1, a service information table T2, and an agency information table T3 which will be explained later. The service center 2 also has an image server for storing the image data S and the order information C, input means for carrying out various kinds of inputs to the order reception server 21, and display means (not shown) for carrying out various kinds of display. The order reception server 21 also functions as means for rerouting.

The large-scale laboratory 3A comprises a laboratory server 31A for receiving the order information C and the image data S transferred from the service center 2 via the network 5, a digital mini-laboratory 32A for generating a print based on the image data S, a postcard generation apparatus 33 for generating a picture postcard, T-shirt printing apparatus 34 for printing the image data S on a T-shirt, input means 35 comprising a keyboard and a mouse for carrying out various kinds of input to the laboratory server 31A, and a monitor 36 for carrying out various kinds of display. In the large-scale laboratory 3A, the print, the picture postcard, and the T-shirt are generated as the printed matter B.

The DPE-store laboratory 3B comprises a laboratory server 31B for receiving the order information C and the image data S transferred from the service center 2 via the network 5, and a digital mini-laboratory 32B for generating a print based on the image data S. The DPE-store laboratory 3B also has input means (not shown) for carrying out various kinds of input to the laboratory server 31B and a monitor (not shown) for carrying out various kinds of display. In the DPE-store laboratory 3B, the print is generated as the printed matter B.

The large-scale laboratory 3A is in collaboration with stores 6A and 6B, and the DPE-store laboratory 3B. The large-scale laboratory 3A delivers the printed matter B such as the print, the picture postcard, or the T-shirt to one of the collaborators 6A, 6B, or 3B designated by the user 1 at the time of placing the order.

Each of the digital mini-laboratories 32A and 32B comprises a printer for generating a print P, a scanner for scanning a negative film, and an image processing apparatus for carrying out image processing on the image data S. Each of the digital mini-laboratories 32A and 32B also has a function of writing the image data S in a recording medium such as a CD-R. In the digital mini-laboratory 32A of the large-scale laboratory 3A, a large print size such as A4 is available. However, the digital mini-laboratory 32B of the DPE-store laboratory 3B cannot process the large print size.

Figure 2:
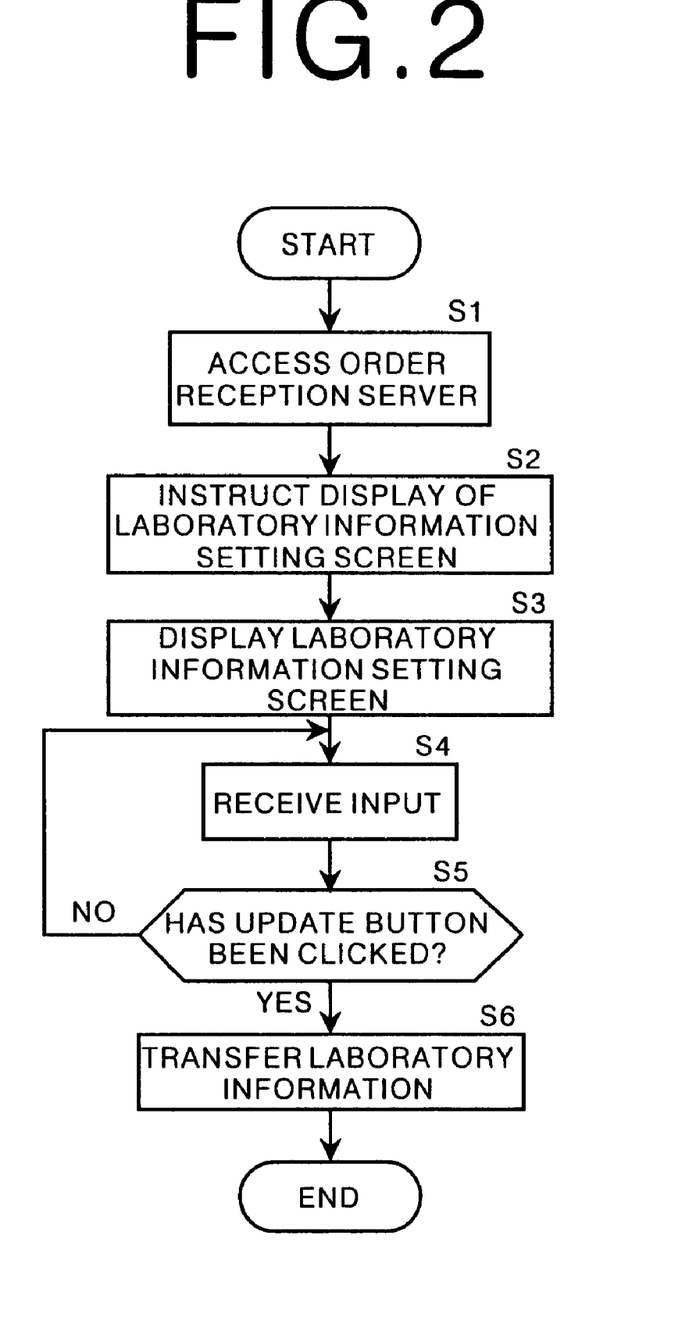
FIG. 2 is a flow chart showing a procedure carried out for registration with a laboratory information table.

Operation of this embodiment will be explained next. FIG. 2 is a flow chart showing a procedure carried out by each of the printing service providers 3 that registers itself with the laboratory information table T1 in the database 22 of the service center 2. The printing service provider 3 accesses the order reception server 21 of the service center 2 via the network 5 (Step S1), and instructs display of a laboratory information setting screen (Step S2). In this manner, a laboratory information setting screen 40 is displayed on the monitor 36 of the printing service provider 3 (Step S3). Various information regarding the printing service provider 3 in access to the order reception server is input in the laboratory information setting screen 40 (Step S4).

Figure 3:
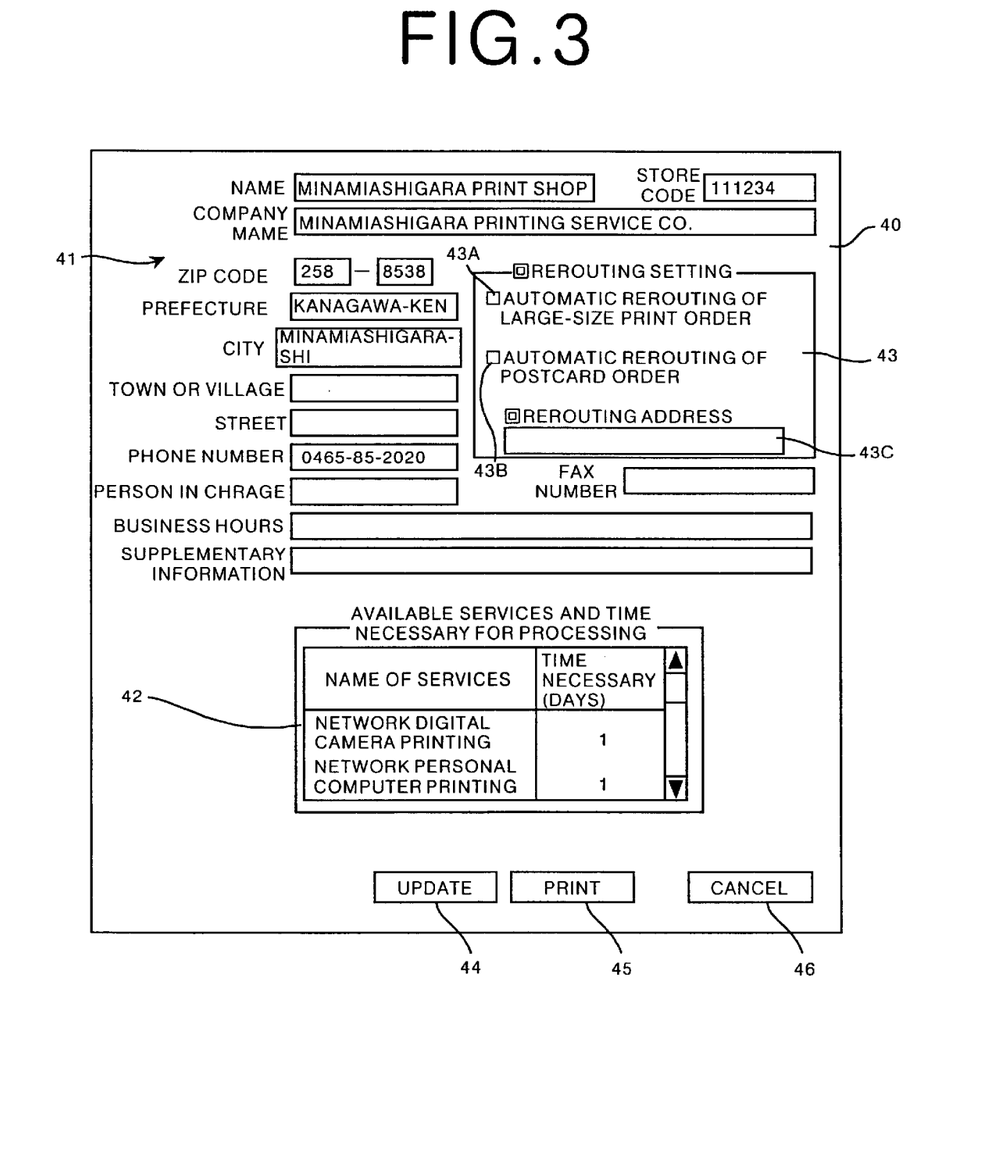
FIG. 3 shows a laboratory information input screen.

More specifically, an operator at the printing service provider 3 inputs the name of the laboratory thereof, the store code specifying the printing service provider 3, the name, the zip code, the address, the phone number, and the fax number of the printing service provider 3, the name of a person in charge of operation, business hours, and supplementary information, in input fields 41 in the setting screen 40. A printing service or printing services available thereat (hereinafter referred to as the available printing services) and the time necessary for order processing are displayed in display fields 42, based on the agency information table T3.

In the case where the order information C transferred to the order reception server 21 with specification of an agency includes processing that cannot be processed by the printing service provider 3 in collaboration with the agency or processing that cannot be processed by the printing service provider 3 if the printing service provider 3 functions as the agency, the order based on the order information C cannot be processed by the printing service provider 3 to which the order information C is addressed. In other words, some of the printing service providers 3 of small scale, such as the DPE-store laboratory 3B acting as the agency itself, may not be able to process an order for a large print size such as A4. Therefore, in the case where one of the printing service providers 3 has been designated as the agency and the order information C includes processing for large-size printing, the printing service provider 3 would not process the print order based on the order information C, even if the order information C and the image data S were transferred thereto.

The viewer software can be set to automatically designate a specific agency at the time of placing the order by using the user terminal 11. In the case where the specific agency is the DPE-store laboratory 3B, the order information C can be sent to the DPE-store laboratory 3B via the order reception server 21 even if the order from the user 1 is for picture post cards. Since the DPE-store laboratory 3B does not have equipment for generating the picture postcards, the DPE-store laboratory 3B could not generate the picture postcards even if the order were received by the DPE-store laboratory 3B.

For this reason, are routing setting field 43 is displayed in the laboratory information setting screen 40, for setting another one of the printing service providers 3 to which the order information C received by the order reception server 21 is rerouted. It is preferable for the rerouting setting field 43 to be used so that the order information C can be rerouted to the printing service provider in collaboration with the printing service provider carrying out the registration, in the case where the order information C specifying the printing service provider carrying out the registration as the agency represents an order for a large-size print and/or a picture postcard which cannot be processed by the printing service provider carrying out the registration.

Check boxes 43A and 43B for selecting "automatic rerouting of large-size print order" and "automatic rerouting of postcard order", and a rerouting address input field 43C are displayed in the rerouting setting field 43. By inputting the name of the printing service provider 3 to which the order information C is rerouted in the rerouting address input field 43C and by selecting the check boxes 43A and/or 43B, automatic rerouting of the large-size print order and/or the postcard order can be set.

In this manner, in the case where the order information C designating the printing service provider of small scale, such as the DPE-store laboratory 3B, as the agency includes a large-size print order and/or the postcard order, the order reception server 21 can reroute the order information C and the image data S to the printing service provider 3 in collaboration with the printing service provider 3 designated as the agency. As a result, the printing service provider 3 specified in the rerouting address field can generate the large-size print and/or the postcard.

When the operator at the printing service provider 3 clicks an Update button 44 shown in FIG. 2 (Step S5), the laboratory information that has been input is sent to the order reception server 21 via the network 5 (Step S6) to end the procedure. If a result at Step S5 is negative, inputting of the laboratory information is judged to be incomplete, and the procedure returns to Step S4 for receiving further input of the laboratory information. The laboratory information is printed by clicking a Print button 45 and canceled by clicking a Cancel button 46.

The service center 2 receives the laboratory information, and the laboratory information is registered with the laboratory information table T1 stored in the database 22.

As has been described above, the printing service provider 3 in access to the order reception server 21 can register the laboratory information with the laboratory information table T1, and the printing service provider 3 can set the laboratory information including the rerouting information as desired.

Meanwhile, all printing services available in the printing service system in this embodiment are registered with the service information table T2 stored in the database 22. More specifically, a printing service for printing image data obtained by the user with a digital camera via the network (hereinafter referred to as network digital camera printing), a printing service for printing image data recorded in a CD-R after reading images photographed on a photographic film by the user via the network (hereinafter referred to as network personal computer printing), a printing service for postcard generation via the network (hereinafter referred to as network postcard printing), and a printing service for printing a photograph album having a plurality of images laid out therein via the network (hereinafter referred to as network photograph album printing) are registered as the printing services available in the system, for example. The network digital camera printing and the network personal computer printing are collectively referred to as ordinary printing.

In the case where a new printing service is added to the printing services available by the printing service system, the service information table T2 is updated. The service information table T2 may be updated by an operator at the service center 2 or by a third party site 4 in collaboration with the service center 2 that accesses the order reception server 21.

The available printing services and the agency or agencies (hereinafter referred to as the agencies) for receiving the printed matter B generated in the available printing services are related to each other and registered with the agency information table T3. For example, ordinary printing, postcard printing, and T-shirt printing are registered as the available printing services for the large-scale laboratory 3A, while the DPE-store laboratory 3B and the stores 6A and 6B are registered as the agencies therefor.

For the DPE-store laboratory 3B, only ordinary printing is registered as the printing service available thereat, and the DPE-store laboratory 3B itself is registered as the agency therefor. Registration of the available printing services and the agencies will be explained later. The agencies are registered at the time of registration with the laboratory information table T1 shown in FIG. 3.

In this embodiment, an agency selection screen is displayed on the user terminal 11 for selecting the specific agency at which the printed matter B is received, when the user 1 places the order. The agencies close to the place of residence of the user 1 are shown in the form of a list in the agency selection screen, based on the address of the user 1, for example. Only the agencies providing the printing service desired by the user 1 (hereinafter referred to as the desired printing service) are shown in the screen. If the DPE-store laboratory functions as one of the agencies and can provide the desired printing service, the DPE-store laboratory 3B is included in the list. If the large-scale laboratory 3A provides the desired printing service, the collaborators for the laboratory 3A are included in the list.

In this embodiment, the DPE-store laboratory 3B has been registered with the agency information table T3 as one of the agencies in collaboration with the large-scale laboratory 3A. At the same time, both the DPE-store laboratory 3B and the large-scale laboratory 3A provide the same ordinary printing service. If the user 1 places the order for ordinary printing and the list of agencies close to the place of residence of the user 1 includes the DPE-store laboratory 3B, the DPE-store laboratory 3B can be displayed twice in the list, since the DPE-store laboratory 3B has been registered with the agency information table T3 as one of the agencies in collaboration with the large-scale laboratory 3A and as the agency for the DPE-store laboratory itself. The user 1 would be confused at the time of agency selection if the same agency were listed twice.

For this reason, in this embodiment, the available printing services for each of the printing service providers 3 and the agencies for receiving the printed matter B generated in each of the printing services can be registered with the agency information table T3, for each of the printing service providers 3. More specifically, the DPE-store laboratory 3B registers itself as the agency for ordinary printing. The large-scale laboratory 3A registers only the stores 6A and 6B as the agencies for ordinary printing and registers the DPE-store laboratory 3B and the stores 6A and 6B as the agencies for the printing services not provided by the DPE-store laboratory 3B, such as picture postcard generation and printing on a T-shirt.

In this manner, when the user 1 places the order for ordinary printing, the DPE-store laboratory 3B is not displayed twice in the list, and the user 1 does not need to be confused.

Figure 4:
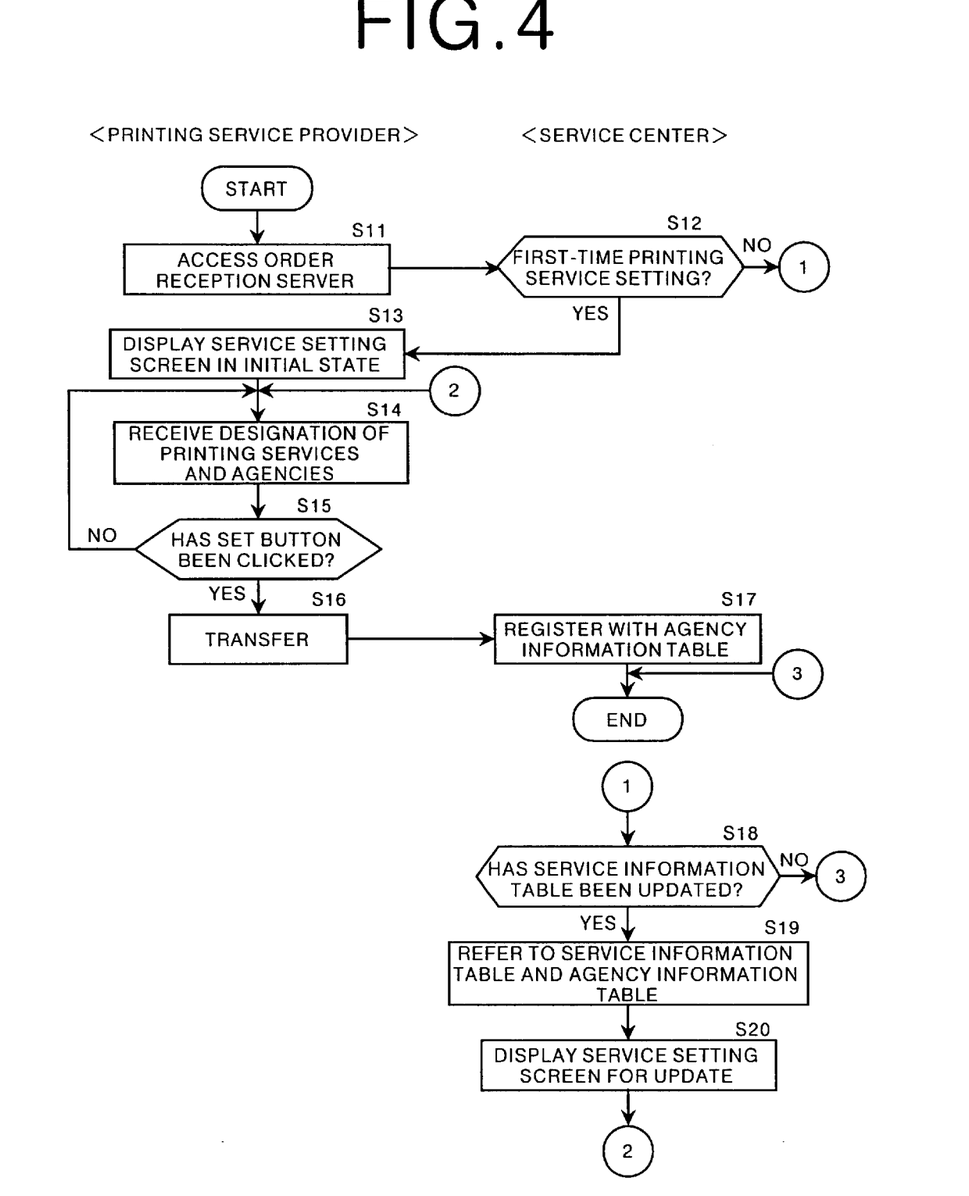
FIG. 4 is a flow chart showing a printing service registration procedure.
Figure 5:
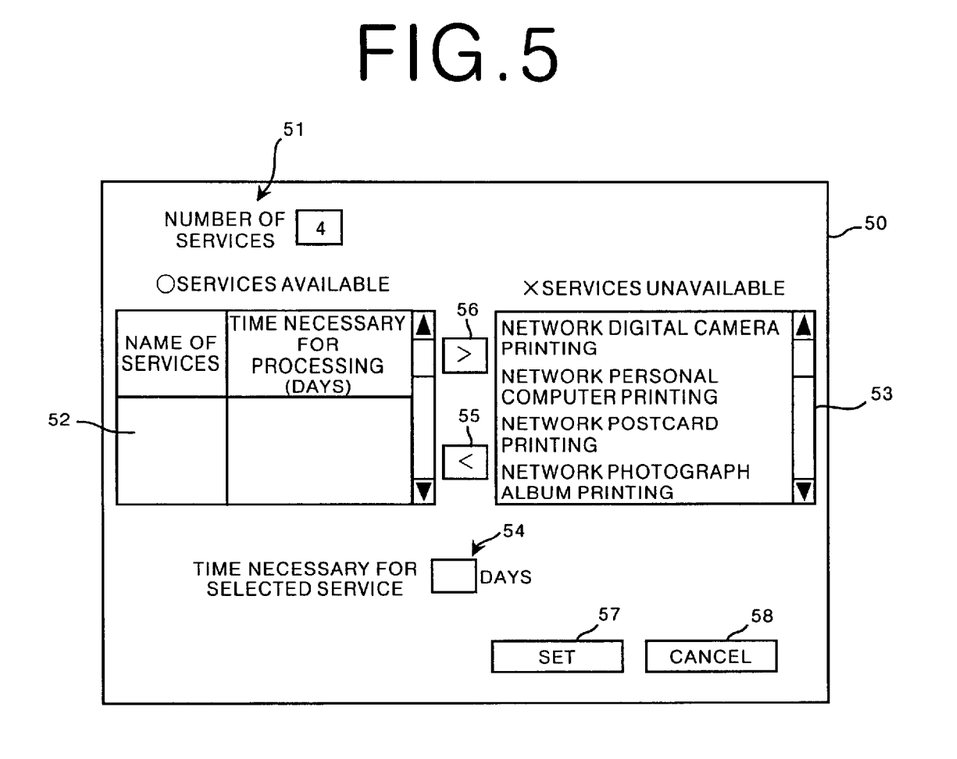
FIG. 5 shows a service setting screen (case 1)

Hereinafter, registration of the available printing services and registration of the agencies carried out by each of the printing service providers 3 will be explained. FIG. 4 is a flow chart showing a procedure of printing service registration. The printing service provider 3 carrying out the registration accesses the order reception server 21 via the network 5 (Step S11). At this time, an ID and a password are input to identify the printing service provider 3 for accessing the order reception server 21. The service center 2 judges whether the available printing services are registered by the printing service provider 3 for the first time (Step S12). If a result at Step S12 is affirmative, a service setting screen (in an initial state) is displayed on the monitor 36 of the printing service provider 3, as shown in FIG. 5 (Step S13). In the service setting screen 50 are shown a field 51 for showing the number of the available printing services, a field 52 for displaying the name of each of the printing services to be registered, a field 53 for displaying the name of each of the printing services not available at the printing service provider 3, a field 54 for displaying the time necessary for a selected one of the available printing services, a Move Setting button 55 for moving any one of the printing services that has become available from the field 53 to the field 52, a Cancel Setting button 56 for moving any one of the printing services that has become unavailable from the field 52 to the field 53, a Set button 57 for confirming the settings, and a Cancel button 58 for canceling the settings.

Figure 6:
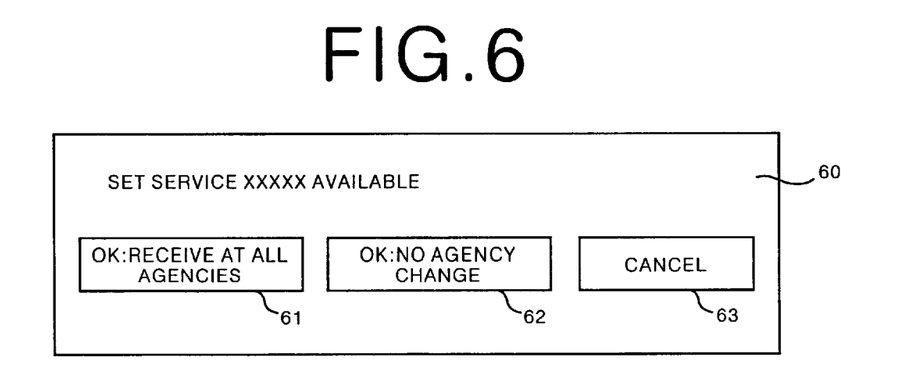
FIG. 6 shows a confirmation screen.

Since the result at Step S12 is affirmative, the printing services are judged to be registered for the first time, and nothing is displayed in the field 52. All the printing services available in the service information table T2 (that is, network digital camera printing, network personal computer printing, network postcard printing, and network photograph album printing) are shown in the field 53. An operator at the printing service provider 3 in access to the order reception server 21 designates the available printing services and the agencies in the service setting screen 50 (Step S14). The operator designates the available printing services and the agencies in the following manner. First, the operator selects one of the printing services in the field 53 and clicks the Move Setting button 55. A confirmation screen 60 is then displayed, as shown in FIG. 6. In the confirmation screen 60 are displayed Receivable At All Agencies button 61, No Agency Change button 62, and Cancel button 63. When the Receivable At All Agencies button 61 is clicked, the printed matter B generated in the selected printing service can be received at all the agencies registered with the laboratory information table T1, and this setting is registered with the agency information table T3. By clicking No Agency Change button 62, the printing service that has been selected is registered as the printing service available at the printing service provider 3, but the printed matter B generated in the selected service cannot be received at the agencies registered with the laboratory information table T1. That is, services which had previously been receivable at the agencies associated with the service provider 3 are still available thereat, but not the newly registered printing service. This setting is registered with the agency information table T3. In this case, which of the agencies can receive the printed matter B generated in which of the available printing services can be set.

Figure 7:
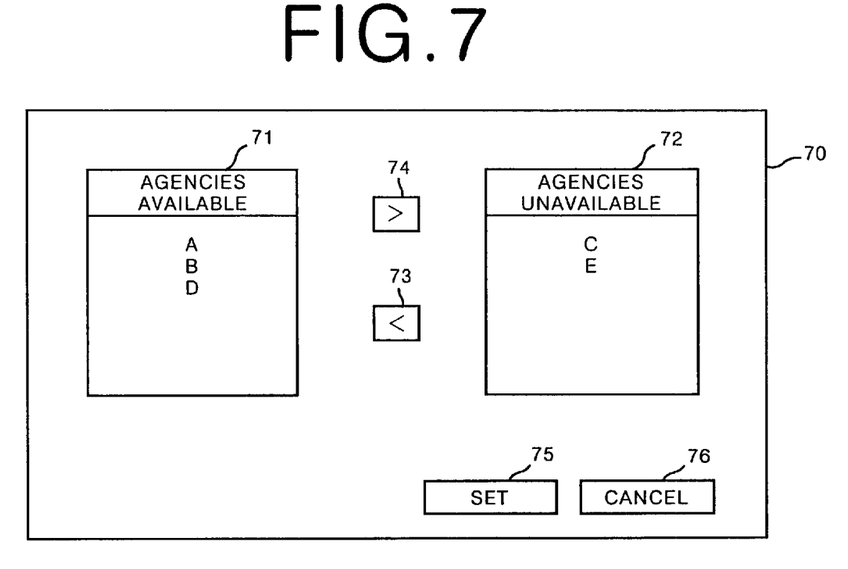
FIG. 7 shows an agency setting screen.

FIG. 7 shows an agency setting screen 70. The agency setting screen 70 is displayed by clicking the button 62 in the confirmation screen 60. As shown in FIG. 7, in the agency setting screen 70 are displayed a field 71 for displaying the name of each of the agencies at which the printed matter B generated in the selected printing service is received, a field 72 for displaying the name of each of the agencies at which the printed matter B is not received, Move Setting button 73 for moving any one of the agencies that can receive the printed matter B from the field 72 to the field 71, Cancel Setting button 74 for moving any one of the agencies that does not receive the printed matter B from the field 71 to the field 72, Set button 75 for confirming the settings, and Cancel button 76 for canceling the settings.

The operator at the printing service provider 3 selects one of the agencies displayed in the field 72 and clicks the Move, Setting button 73. The name of the selected agency is then displayed in the field 71. In FIG. 7, stores A, B, and D have been designated as the agencies at which the printed matter B can be received. In the case where the printed matter B cannot be received at one of the agencies displayed in the field 71, the agency is selected in the field 71 and the Cancel Setting button 74 is clicked. In this manner, the agency is displayed in the field 72. In FIG. 7, stores C and E are designated as stores that are not the agencies at which the printed matter B can be received. By clicking the Set button 75, the agencies for receiving the printed matter B generated in the printing service specified in the service setting screen 50 are designated. By clicking the Cancel button 76, the confirmation screen 60 is then displayed again.

Figure 8:
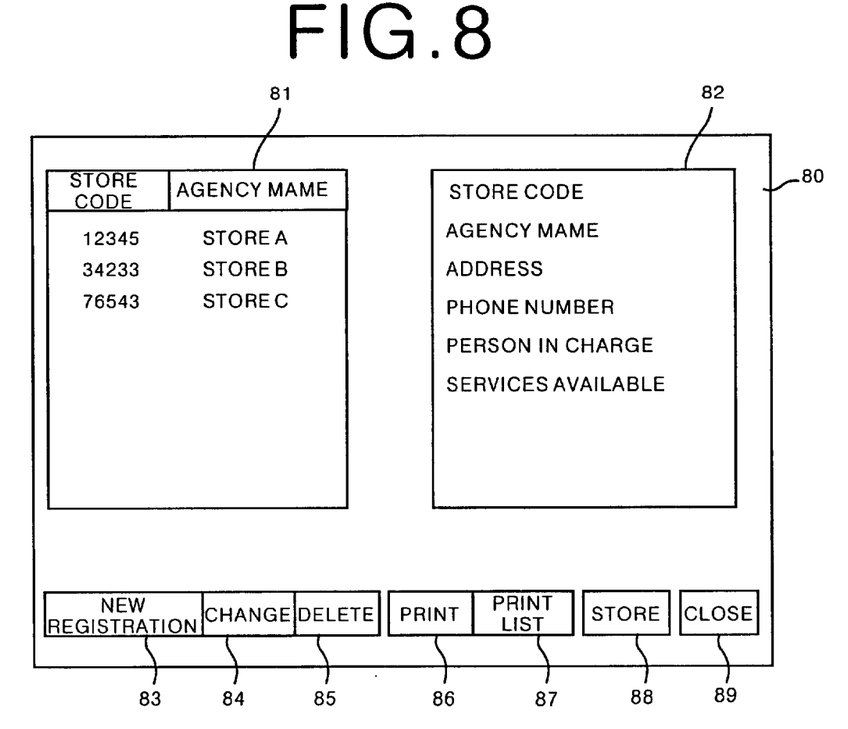
FIG. 8 shows another agency setting screen.

The agencies may also be designated in the following manner. FIG. 8 shows another example of an agency setting screen. The agency setting screen 80 in FIG. 8 is displayed by clicking the button 62 in the confirmation screen 60. As shown in FIG. 8, in the agency setting screen 80 are displayed a field 81 for displaying a list of agencies registered with the laboratory information table T1, a field 82 for displaying detailed information of one of the agencies selected in the field 81, New Registration button 83 for newly registering an agency, Change button 84 for changing the information on the agency selected in the field 81, Delete button 85 for deleting the agency selected in the field 81, Print button 86 for printing the detailed information of the agency selected in the field 81, Print List button 87 for printing the list of the agencies displayed in the field 81, Store button 88 for storing the settings, and Close button 89 for closing the agency setting screen 80.

Figure 9:
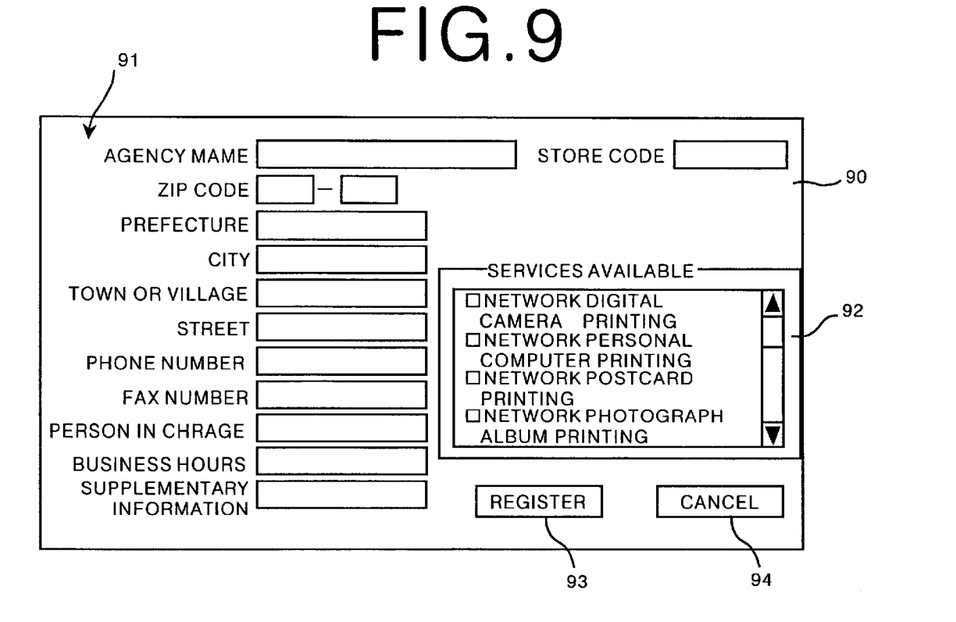
FIG. 9 shows detailed-information setting screen.

When the operator at the printing service provider 3 selects one of the agencies displayed in the field 81 and clicks the Change button 84, a detailed-information setting screen 90 is displayed regarding the agency, as shown in FIG. 9. By clicking the New Registration button 83, the detailed-information setting screen 90 is also displayed. As shown in FIG. 9, input fields 91 for inputting the detailed information on the agency, a service selection field 92 for selecting the printing services available thereat, Register button 93 for registering the settings, and Cancel button 94 for canceling the input are shown in the detailed-information setting screen 90.

The operator at the printing service provider 3 inputs the name of the agency, the store code for identifying the agency, the zip code, the address, the phone number, the fax number, the name of a person in charge, business hours, and supplementary information in the input fields 91. The operator also selects the printing services available at the agency in the service selection field 92. The printing services can be selected by selecting check boxes displayed on the left of the names of the printing services. In the case where one of the printing services that has been available at the agency is no longer available, the check box corresponding to the service is cleared. By clicking the Register button 93, the settings are registered. The settings are cancelled if the Cancel button 94 is clicked.

By clicking the Register button 93 or the Cancel button 94, the agency setting screen 80 shown in FIG. 8 is displayed again. By clicking the Store button 88 in the agency setting screen 80, the settings are stored. When the Close button 94 is clicked, the agency setting screen 80 is closed. In the case where the Close button 89 is clicked before the Store button 88 is clicked, the settings input in the detailed-information setting screen 90 are also canceled and not stored.

Figure 10:
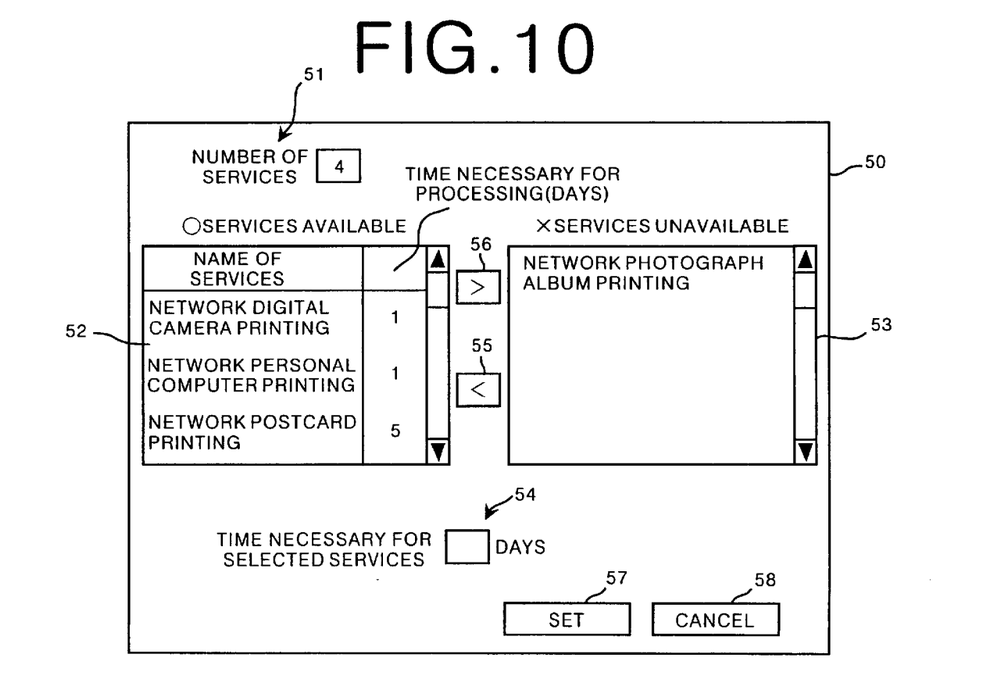
FIG. 10 shows the service setting screen (case 2)

After the agency has been specified, the printing services that have been registered (network digital camera printing, network personal computer printing, network postcard printing, and network photograph album printing) are displayed in the field 52, as shown in FIG. 10. At this time, the time necessary for processing can be input for each of the printing services in the field 54. By canceling the Cancel button 63, the service setting screen 50 is displayed again.

The operator designates the available printing services and the agencies therefor, and clicks the Set button 57 (Step S15). The information representing the printing services and the agencies is then sent to the order reception server 21 via the network 5 (Step S16). The order reception server 21 registers the information with the agency information table T3 (Step S17) to end the procedure. If a result at Step S15 is negative, designation of the printing services and the agencies is judged to be incomplete, and the procedure returns to Step S14 for further designation.

Figure 11:
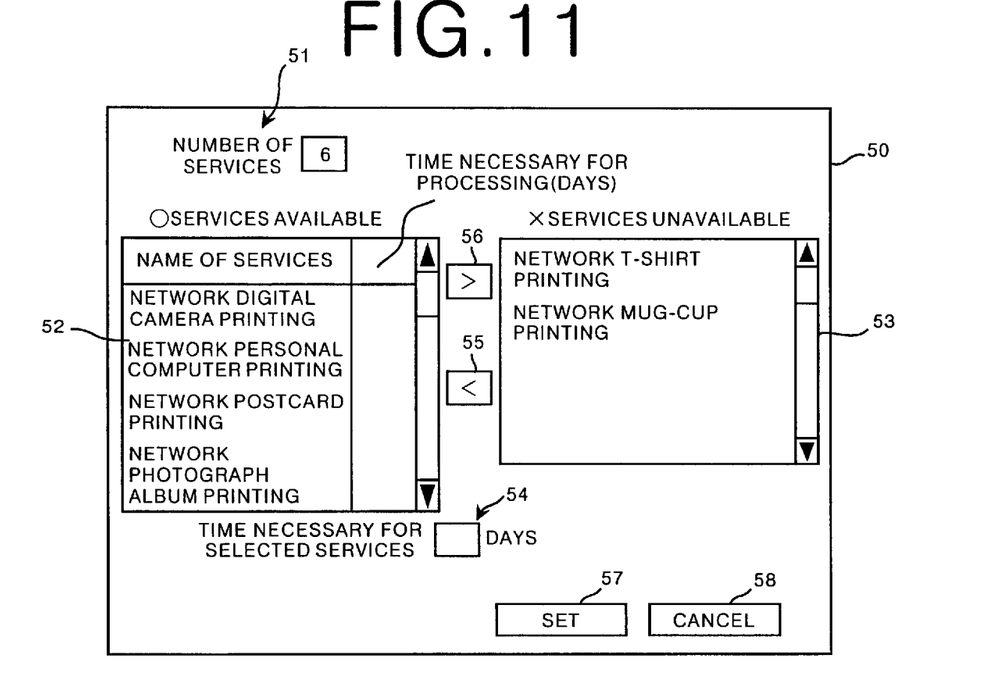
FIG. 11 shows the service setting screen (case 3)

Meanwhile, if the result at Step S12 is negative, whether or not the service information table T2 has been updated since the last access is judged (step S18). If a result at Step S18 is negative, the service information table T2 is judged that it has not been updated since the last access, and the procedure ends. If the result at Step S18 is affirmative, the service information table T2 is judged to have been updated and the service information table T2 and the agency information table T3 are referred to (Step S19). The service setting screen 50 for updating the information regarding the available printing services is then displayed (Step S20). FIG. 11 shows the service setting screen 50 for updating the service information. As shown in FIG. 11, the printing services that the printing service provider 3 in access to the order reception server 21 currently provides (network digital camera printing, network personal computer printing, network postcard printing, and network photograph album printing) are displayed in the field 52 in the service setting screen 50. The printing services not available at the printing service provider 3 and a printing service or printing services newly registered are shown in the field 53. In FIG. 11, a network T-shirt printing service for printing image data on a T-shirt by receiving an order via the network and a network mug-cup printing service for printing image data on a mug cup by receiving an order via the network are newly added to the printing services. The printing services currently available at the printing service provider 3 are network digital camera printing, network personal computer printing, network postcard printing, and network photograph album printing.

The operator at the printing service provider 3 designates the new printing services, as has been carried out at Step S14, and designates the agencies for receiving the printed matter B generated in the newly added printing services. In order to suspend one of the printing services that has become unavailable, the unavailable printing service is selected in the field 52 and the Cancel button 56 is clicked. The selected printing service is then displayed in the field 53. At this time, a confirmation screen is preferably displayed for confirming suspension of the printing service that has been selected.

The printing services newly available are then designated, and the agencies therefor are also designated. By clicking the Set button 57 thereafter (step S15), information representing the printing services that have been added and the agencies therefor is transferred to the order reception server 21 via the network 5 (Step S16). The order reception server 21 registers the information that has been transferred thereto with the agency information table T3 in the database 22 (Step S17) to end the procedure.

Figure 12:
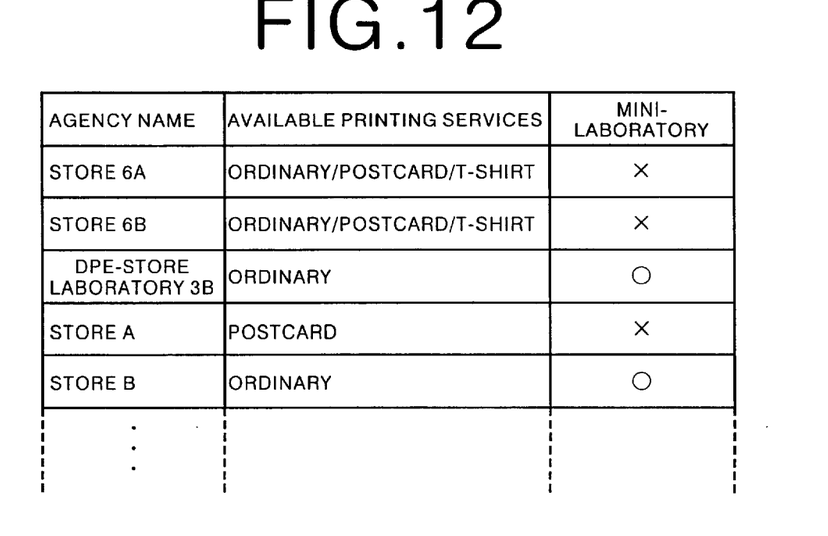
FIG. 12 shows an agency information table.

FIG. 12 shows the agency information table T3. As shown in FIG. 12, the agency information table T3 stores information on the name of the agency, the printing services generating the printed matter B that the agencies receive, and information indicating whether or not each of the agencies is a DPE-store laboratory.

Figure 13:
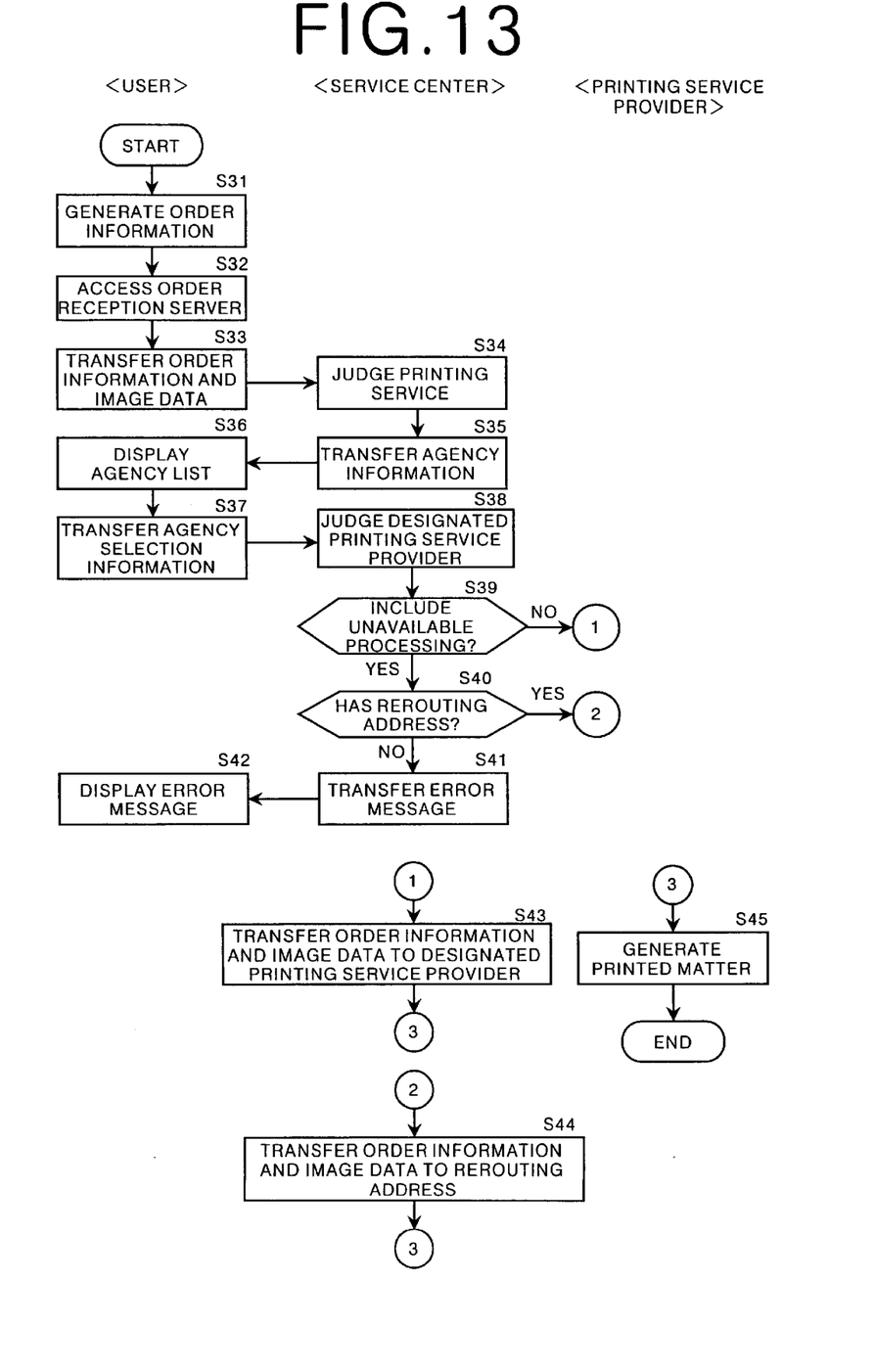
FIG. 13 is a flow chart showing a procedure carried out at the time of placing a print order.

A procedure carried out at the time of placing the order in this embodiment will be explained next. FIG. 13 is a flow chart showing the procedure. While using the viewer software, the user 1 selects the image data S used for generating the printed matter B from the image data obtained by the digital camera or recorded in the CD-R or the like, and the user 1 inputs a quantity and a print size for the printed matter B to generate the order information C (Step S31). The user 1 accesses the order reception server 21 of the service center 2 (Step S32), and transfers the order information C and the image data S to the order reception server 21 (Step S33).

The order reception server 21 judges the desired printing service, based on the order information C (Step S34), and transfers to the user terminal 11 the information representing the agencies at which the printed matter B generated in the desired printing service can be received, by referring to the agency information table T3 (Step S35).

Figure 14:
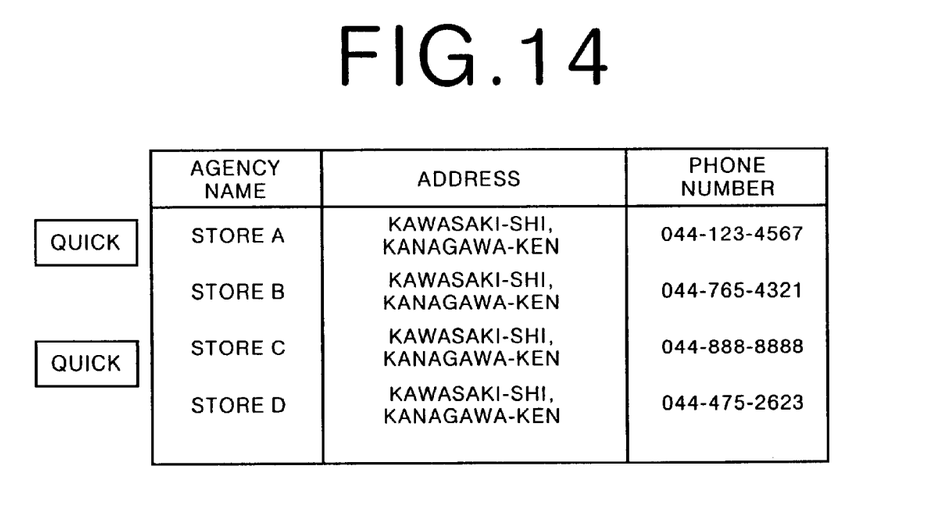
FIG. 14 shows a list of agencies.

A list of the agencies for receiving the printed matter B generated in the desired printing service is displayed on the user terminal 11, as shown in FIG. 14 (Step S36). For the agency functioning as the DPE-store laboratory, a "QUICK" mark is displayed. This mark refers to shorter time necessary for processing when compared with the agencies in collaboration with the large-scale laboratory, due to delivery being unnecessary. After the user 1 selects one of the agencies as desired, the information regarding this selection is transferred to the order reception server 21 (Step S37).

The order reception server 21 judges the printing service provider to which the order information C and the image data S are addressed (hereinafter referred to as a designated printing service provider 3'), based on the information regarding the selected agency (Step S38). The printing service provider 3 in collaboration with the agency specified by the user 1 is used as the designated printing service provider 3'. If the agency specified by the user 1 also acts as the printing service provider, the printing service provider is used as the designated printing service provider 3'.

Whether or not the order information C includes processing not carried out by the designated printing service provider 3' is judged (Step S39). If a result at Step S39 is affirmative, whether or not the designated printing service provider 3' has the rerouting address is judged, based on the laboratory information table T1 stored in the database 22 (Step S40). In the case where no rerouting address is available, the designated printing service provider 3' cannot provide the desired printing service based on the order information C. Therefore, an error message indicating that the desired printing service is not available is transferred to the user terminal 11 (Step S41). The message is displayed on the user terminal 11 (Step S42), and the user 1 can recognize the mistake in agency selection. Therefore, the user 1 can carry out agency selection again at Step S36.

If the result at Step S39 is negative, the order information C and the image data S are transferred to the designated printing service provider 3' (Step S43). In the case where the desired printing service is ordinary printing service and the store 6A is designated as the agency in this embodiment, the order information C and the image data S are transferred to the large-scale laboratory 3A. If the agency that has been designated is the DPE-store laboratory 3B, the order information C and the image data S are transferred to the DPE-store laboratory 3B.

If a result at Step S40 is affirmative, the order information C and the image data S are transferred to the printing service provider designated as there routing address (Step S44). In the case where the desired printing service is ordinary printing and the DPE-store laboratory 3B is designated as the agency, the order information C may include processing not carried out by the DPE-store laboratory 3B, such as A4-size printing. In this case, the order information C and the image data S are transferred to the large-scale laboratory 3A after the result at Step S40 becomes affirmative, if the DPE-store laboratory 3B has set the large-scale laboratory 3A as the rerouting address in the laboratory information table T1.

The printing service provider 3 (including the designated printing service provider 3') that received the order information C and the image data S generates the printed matter B based on the order information C (Step S45) to end the procedure. For example, in the case where the order information C and the image data S have been sent to the large-scale laboratory 3A, printing including large-size printing by the digital mini-laboratory 32A, or generation of a picture postcard by the postcard generation apparatus 33, or generation of a T-shirt with the image data S printed thereon by the T-shirt printing apparatus 34 is carried out. In the case where the order information C and the image data S have been sent to the DPE-store laboratory 3B, printing is carried out by the digital mini-laboratory 32B.

In the case where the printing service provider 3 that has generated the printed matter B is the large-scale laboratory 3A, the printed matter B is delivered or mailed to the store 6A or 6B, or to the DPE-store laboratory 3B designated by the user 1. In the case where the order information C has been rerouted, the printed matter B is delivered or mailed to the agency specified by the user 1. In this case, the user 1 receives the printed matter B at the store 6A or 6B, or at the DPE-store laboratory 3B. In the case where the printing service provider 3 that generated the printed matter B is the DPE-store laboratory 3B, the user 1 receives the printed matter B at the DPE-store laboratory 3B.

In some cases, the printing service provider 3 that received the order information C and the image data S cannot process the order due to malfunctioning of the printer, printing paper running short, or too many orders to process, for example. In such a case, the printing service provider 3 that received the printing order may record the order information C and the image data S in a recording medium to forward the order to another one of the printing service providers 3.

In other cases, the image data S may be damaged after reception by the printing service provider 3. The printed matter B ordered by the user 1 cannot be generated from the image data S that have been damaged. Therefore, the printing service provider 3 preferably accesses the order reception server 21 and requests transfer of the image data S thereto by specifying a file name of the image data S. At this time, by inputting an order ID specifying the order information C, the image data S can be prevented from being received by another one of the printing service providers 3.

As has been described above, according to this embodiment, in the case where the order information C includes processing that cannot be processed by the designated printing service provider 3', the order information C is sent to the printing service provider 3 specified by the designated printing service provider 3' in the rerouting information in the laboratory information table T1. Therefore, the order information C is directly sent from the order reception server 21 to the printing service provider 3 without being sent to the designated printing service provider 3'. In this manner, the order information C can be rerouted efficiently to the printing service provider 3 that can process the printing order, compared with the case of sending the order information C to the designated printing service provider 3' first. Furthermore, since the order information C is not forwarded via the designated printing service provider 3' in the case where the order information needs to be sent to the printing service provider 3 that can process the order, the time necessary for providing the printed matter B can be shortened, compared with the case of sending the order information C via the designated printing service provider 3'.

Moreover, by storing in the database 22 the laboratory information table T1 having the rerouting information and by sending the order information C based on the laboratory information table T1, the order information can be rerouted easily and thus efficiently.

What is claimed is:

1. A printing service system comprising:

an order reception server installed in a service center for receiving order information representing an order of a user for a printing service regarding image data, from an order terminal via a network; and printing service provider servers each communicable with the order reception server via the network and each installed in a printing service provider in collaboration with at least one agency capable of receiving printed matter generated in the printing service or installed in a printing service provider acting as an agency itself capable of receiving the printed matter generated in the printing service, wherein each of the printing service providers registers with the service provider information table by using the printing service provider server thereof that accesses the order reception server, the printing service system receiving designation of any one of the agencies capable of receiving the printed matter by using the terminal at the time the order for the printing service is placed, and the order reception server transferring the order information to the printing service provider that is designated according to the designated agency, wherein the order reception server carries out rerouting of the order information to one of the printing service providers capable of processing the order, in the case where the order information includes an order that cannot be processed by the designated printing service provider, and wherein the order reception server comprises a center database storing a service provider information table with which service provider information including information regarding the rerouting is registered for each of the printing service providers and reroutes the order information to said one of the printing service providers capable of processing the order that is not processed by the designated printing service provider, based on the service information table.

2. A printing service system as defined in claim 1, wherein the designated printing service provider is a mini-laboratory and the order that cannot be processed by the designated printing service provider represents large-size printing and/or postcard printing.

3. An order reception server used in a printing service system, the printing service system comprising:

said order reception server installed in a service center for receiving order information representing an order of a user for a printing service regarding image data, from an order terminal via a network, wherein the order reception server comprises a center database storing a service provider information table with which service provider information including the information regarding the rerouting is registered for each of the printing service providers and the means for carrying out rerouting transfers the order information to said one of the printing service providers capable of processing the order that cannot be processed by the designated service provider, based on the service provider information table; and printing service provider servers each communicable with the order reception server via the network and each installed in a printing service provider in collaboration with at least one agency capable of receiving printed matter generated in the printing service or installed in a printing service provider acting as an agency itself capable of receiving the printer matter generated in the printing service, wherein each of the service providers registers with the service provider information table by using printing printing service provider server thereof that is accessed by the order reception server, the printing service system receiving designation of any one of the agencies capable of receiving the printed matter by using the order terminal at the time the order for the printing service is placed, and said order reception server transferring the order information to the printing service provider that is designated according to the designated agency, wherein said order reception server comprises means for carrying out rerouting of the order information to one of the printing service providers capable of processing the order that cannot be processed by the designated printing service provider, in the case where the order information includes an order that cannot be processed by the designated printing service provider.

4. An order reception server as defined in claim 3, wherein the designated printing service provider is a mini-laboratory and the order that cannot be processed by the designated printing service provider represents large-size printing and/or postcard printing.

5. An order reception method used by an order reception server in a printing service system, the printing service system comprising:

the order reception server installed in a service center for receiving order information representing an order of a user for a printing service regarding image data, from an order terminal via a network; and printing service provider servers each communicable with the order reception server via the network and each installed in a printing service provider in collaboration with at least one agency capable of receiving printed matter generated in the printing service or installed in a printing service provider acting as an agency itself capable of receiving the printed matter generated in the printing service, wherein each of the printing service providers registers with the service provider information table by using the printing service provider server thereof that accesses the order reception server, the printing service system receiving designation of any one of the agencies capable of receiving the printed matter by using the order terminal at the time the order for the printing service is placed, and the order reception server transferring the order information to the printing service provider that is designated according to the designated agency, said order reception method comprising the step of:

carrying out rerouting of the order information to one of the printing service providers capable of processing the order that cannot be processed by the designated printing service provider, in the case where the order information includes an order that cannot be processed by the designated printing service provider, wherein, in the case where the order reception server comprises a center database storing a service provider information table with which service provider information including information regarding the rerouting is registered for each of the printing service providers, the step of carrying out rerouting is the step of carrying out rerouting of the order information to said one of the printing service providers capable of processing the order that cannot be processed by the designated printing service provider, based on the service provider information table.

6. An order reception method as defined in claim 5, wherein the designated printing service provider is a mini-laboratory and the order that cannot be processed by the designated printing service provider represents large-size printing and/or postcard printing.

7. A computer-readable recording medium storing a program that causes a computer to execute an order reception method used by an order reception server in a printing service system, the printing service system comprising:

the order reception server installed in a service center for receiving order information representing an order of a user for a printing service regarding image data, from an order terminal via a network; and printing service provider servers each communicable with the order reception server via the network and each installed in a printing service provider in collaboration with at least one agency capable of receiving printed matter generated in the printing service or installed in a printing service provider acting as an agency itself capable of receiving the printed matter generated in the printing service, wherein each of the printing service providers registers with the service provider information table by using the printing service provider server thereof that accesses the order reception server, the printing system receiving designation of any one of the agencies capable of receiving the printed matter by using the order terminal at the time the order for the printing service is placed, and the order reception server transferring the order information to the printing service provider that is designated according to the designated agency, the program comprising the procedure of:

carrying out rerouting of the order information to one of the printing service providers capable of processing the order that cannot be processed by the designated printing service provider, in the case where the order information includes an order that cannot be processed by the designated printing service provider, wherein, in the case where the order reception server comprises a center database storing a service provider information table with which service provider information including information regarding the rerouting is registered for each of the printing service providers, the procedure of carrying out rerouting is the procedure of carrying out rerouting of the order information to said one of the printing service providers capable of processing the order that cannot be processed by the designated printing service provider, based on the service provider information table.

* * * * *